US010768070B2

(12) United States Patent
Doray et al.

(10) Patent No.: US 10,768,070 B2
(45) Date of Patent: Sep. 8, 2020

(54) METHOD OF DETERMINING THE HEIGHT OF THE GRAVITY CENTER OF A VEHICLE

(71) Applicant: VOLVO TRUCK CORPORATION, Gothenburg (SE)

(72) Inventors: Jean-Baptiste Doray, Chasse sur Rhône (FR); Fabrice Ranc, Simandres (FR)

(73) Assignee: VOLVO TRUCK CORPORATION, Gothenburg (SE)

( * ) Notice: Subject to any disclaimer, the term of this patent is extended or adjusted under 35 U.S.C. 154(b) by 208 days.

(21) Appl. No.: 15/766,971

(22) PCT Filed: Oct. 16, 2015

(86) PCT No.: PCT/IB2015/002093
§ 371 (c)(1),
(2) Date: Apr. 9, 2018

(87) PCT Pub. No.: WO2017/064529
PCT Pub. Date: Apr. 20, 2017

(65) Prior Publication Data
US 2018/0306665 A1  Oct. 25, 2018

(51) Int. Cl.
*G01M 1/12*  (2006.01)
*G01M 17/007*  (2006.01)
*B60T 8/172*  (2006.01)

(52) U.S. Cl.
CPC .......... *G01M 1/122* (2013.01); *G01M 17/007* (2013.01); *B60G 2400/106* (2013.01); *B60G 2400/63* (2013.01); *B60T 8/172* (2013.01)

(58) Field of Classification Search
CPC .. G01M 1/122; G01M 17/007; G01G 19/086; B60T 8/172; B60T 8/17551; B60G 2400/63
See application file for complete search history.

(56) References Cited

U.S. PATENT DOCUMENTS

| 5,265,946 A * | 11/1993 | Bader | B60T 8/172 303/146 |
| 8,751,141 B2 * | 6/2014 | Ranc | B60T 8/172 701/124 |
| 8,825,286 B2 * | 9/2014 | Kroeger | B60G 17/0182 180/282 |
| 2002/0165690 A1 * | 11/2002 | Hessmert | B60G 17/019 702/169 |
| 2003/0149515 A1 * | 8/2003 | Hessmert | B60T 8/17551 701/31.4 |

(Continued)

FOREIGN PATENT DOCUMENTS

| WO | 2004074804 A1 | 9/2004 |
| WO | 2011036511 A1 | 3/2011 |
| WO | 2013141787 A1 | 9/2013 |

OTHER PUBLICATIONS

International Search Report (dated Jun. 23, 2016) for corresponding International App. PCT/IB2015/002093.

(Continued)

*Primary Examiner* — Natalie Huls
(74) *Attorney, Agent, or Firm* — Venable LLP; Jeffri A. Kaminski (57) ABSTRACT

The height of the center of gravity of a vehicle having at least 3 axles is estimated using the slippage rate of the wheels.

10 Claims, 2 Drawing Sheets

(56) References Cited

U.S. PATENT DOCUMENTS

| | | | | |
|---|---|---|---|---|
| 2009/0099718 A1* | 4/2009 | Kobetz | .............. | B60G 17/0164 |
| | | | | 701/31.4 |
| 2010/0036597 A1* | 2/2010 | Fiedler | ................. | B60G 17/019 |
| | | | | 701/124 |
| 2011/0224895 A1* | 9/2011 | Kroeger | ............. | B60G 17/0182 |
| | | | | 701/124 |
| 2012/0022760 A1* | 1/2012 | Kato | ..................... | B60T 8/1766 |
| | | | | 701/70 |
| 2012/0173133 A1* | 7/2012 | Ranc | ....................... | B60T 8/172 |
| | | | | 701/124 |
| 2019/0054905 A1* | 2/2019 | Doray | ................... | B60W 40/13 |

OTHER PUBLICATIONS

Deleer Barazanji: "Model Based Estimation of Height of Center of Gravity in Heavy Vehicles" Mar. 21, 2012 (Mar. 21, 2012). XP55278101. Retrieved from the Internet: URL:http://www.diva-portal. sejsmashjgetjdi va2:513813/FULLTEXT02.pdf [retrieved on Jun. 6, 2016].

* cited by examiner

METHOD OF DETERMINING THE HEIGHT OF THE GRAVITY CENTER OF A VEHICLE

BACKGROUND AND SUMMARY

The present invention relates to the estimation of the height of the center of gravity of a vehicle, and in particular of an industrial vehicle.

The height of the center of gravity (COG) of a vehicle has a strong impact on its behavior on road. Various systems tend to automatically control the behavior of the vehicle using the height of COG as a key parameter. This is the case for ESP functions and also for other dynamic control assistance. Thus, the height of COG should be determined with enough precision to avoid inappropriate activation of these dynamic control systems. The mass of a vehicle is commonly used to evaluate the height of its COG. However, depending of the nature of the payload, the mass may not be relevant enough. Furthermore, from one mission to the other, the nature of the payload may change, rendering the determination of the height of COG even more difficult. Thus, there is a need to improve the determination of the height of COG under true driving conditions.

WO2011036511 provides a method to evaluate the height of COG of a commercial vehicle having 2 axles. It is desirable to determine the height of COG for vehicles having more than 2 axles. Other prior art refers to methods for estimating the height of COG for a vehicle such as patent application US2011224895, especially vehicles comprising a trailer coupled to a tractor such as international patent applications WO2013141787 and WO2004074804 and the publication of Deleer Barazanji concerning "Model Based Estimation of Height of Centre of Gravity in Heavy Vehicles".

It is desirable to determine the height of COG of a vehicle in motion, and more particularly when the speed of the vehicle varies. This method, according to an aspect thereof, applies more specifically to vehicles having more than two axles, e.g. vehicles having 3, 4, 5 or more axles. This method is, according to an aspect thereof, therefore well appropriate to industrial vehicles in general.

It is also desirable to consider the parameters already sensed within the vehicle, in such a way that there is no need to add specific sensors or devices.

3 reference points are predetermined within the vehicle. A reference point, in the sense of the present invention, means a physical point or a virtual point within the vehicle, wherein tangential and normal forces are determined. The values of these tangential and normal forces are then computed to determine the height of the COG. In particular, in case of a rigid vehicle having 3 axles, the 3 reference points coincide with the 3 axles of the vehicle. In case the vehicle is a combination of a tractor and a semi-trailer, a reference point corresponds to the first axle of the tractor, another reference point corresponds to an axle of the semi-trailer, and the last reference point corresponds to the fifth wheel of the tractor.

Above and below, the tangential forces include the forces tangential to the wheels at the point of contact with the ground. They are applied to the running direction of the vehicle, during an acceleration, and opposite to the running direction of the vehicle during a braking phase. A tangential force may be applied similarly at any other point within the vehicle, like the fifth wheel of a tractor. For the purpose of the present method, the tangential forces preferably denote forces opposite to the running direction of the vehicle. Tangential forces can thus result from the braking forces of the braking system of the vehicle, the retarder or any other forces that slow down the vehicle, as well as the combination thereof.

The normal forces are orthogonal to the tangential forces and mainly result from the weight of the vehicle. The normal forces vary in case of change of speed of the vehicle, and in particular during the braking phases.

Above and below, a driving force should be understood as the force provided by the engine, or the electrical system in case of an hybrid or electrical vehicle, and includes the resistive forces such as the retarder, and the engine brake. The driving force has a tangential resultant and a normal resultant.

Above and below, a rigid truck means a vehicle which is not articulated. It can be a carrier, a tractor of a semi-trailer, without the semi-trailer, or any other non-articulated vehicle. It comprises one or more steering axles, preferably one steering axle and one or more driving axles.

The present method, according to an aspect thereof, comprises a first step of determining the tangential forces at all the axles of the vehicle. In case of a combination of a tractor and a semi-trailer, the tangential forces at the axles of the tractor and semi-trailer are considered.

The present method, according to an aspect thereof, comprises a second step of deducing the corresponding normal forces from the tangential forces, previously determined. The normal force at a given axle is deduced from the corresponding tangential force thanks to the slippage rate of the wheels of said axle. For easiness, it may be considered that all the wheels of a given axle have the same slippage rate. However, the method may be applied with various slippage rates from one wheel to the other. For the purpose of the present method, the slippage rate should be maintained as low as possible. In particular, the method may be considered reliable as long as the slippage rate is equal or below about 10% at each wheel.

It is envisaged than when one of the reference points does not correspond to an axle of the vehicle, then a separate step may be initiated to determine the normal force at said reference point. This may be the case for example when the vehicle is a combination of a tractor and a semi-trailer, wherein the fifth wheel is a reference point. In that case, the normal force at the fifth wheel is determined on the basis of the tangential and normal forces determined at the axles of the tractor. It has to be noted that in this particular case, the determination of the normal force at the fifth wheel only considers the tangential and normal forces determined at the wheels of the tractor.

The steps above-discussed, performed during an acceleration phase, lead to the determination of the normal forces at each of the 3 reference points of the vehicle. An acceleration phase includes any period wherein the speed of the vehicle increases, as well as any period wherein the speed of the vehicle decreases. For the purpose of the present method, the braking period, wherein the speed decreases, will preferably be considered. However similar reasoning can be established using the driving torque applied to the axles during an acceleration phase, instead of considering the braking forces during a braking phase. During the braking periods, the braking pressure actually applied to the wheels is easily known, thanks to sensors present in the braking system. Thus, the tangential forces are easily determined.

An acceleration phase or an acceleration period should be understood as any period of time where the speed of the vehicle changes. The speed may increase or decrease. The present method can apply to acceleration phases where the speed of the vehicle varies in a non-homogenous way.

However, an acceleration phase or acceleration period preferably denotes a period of time where the speed of the vehicle varies homogeneously. In other words, it preferably corresponds to a period of time where the acceleration remains constant. An acceleration phase or acceleration period lasts from few milliseconds to several seconds.

The steps above discussed are therefore performed together within a single acceleration phase. These steps are reiterated during at least one additional acceleration phase. The acceleration of the vehicle during this additional acceleration phase is preferably different from the acceleration of the vehicle during the first acceleration phase. Preferably, the acceleration of the vehicle between a first and a second acceleration phase differs by more than 10%, more preferably by more than 20% and most preferably by more than 50%. The values of the normal forces at the 3 references points, determined during the first acceleration phase, are computed with the corresponding values determined during the second acceleration phase according to an algorithm, in such a way that the height of the COG can be evaluated.

Although 2 sets of values, determined during 2 distinct acceleration phases, may be enough to determine the height of COG, the steps above-discussed can be repeated several times. All the values corresponding to the height of COG can further be computed to provide an average value.

It has to be noted that a first and a second acceleration phase, during which are generated the 2 sets of values above discussed, may be both part of the same acceleration operation, or may be part of distinct acceleration operations.

Thus, the present method, according to an aspect thereof, comprises the following steps:

Determining the tangential forces at all the axles of the vehicle, during a first acceleration phase, Deducing from the tangential forces determined in step a) the corresponding normal forces during the first acceleration phase, Optionally determining the normal force at one of the predetermined reference points, if not already determined through steps a) and b), during a first acceleration phase, using the values determined in steps a) and b).

Repeating steps a), b), and c) at least once during a second acceleration phase distinct from the first acceleration phase, Deducing from the preceding steps a), b), c) and d) the height of the gravity center G of the vehicle, or an element of said vehicle, by computing the normal forces at said 3 predetermined reference points, using an algorithm.

The present method, according to an aspect thereof, further comprises the optional step:

Repeating steps a) to e) several times and providing an average value of the height of COG.

For the specific case of a rigid vehicle comprising 3 axles, each corresponding to a reference point, the present method may be written as follows:

Determining the tangential forces at the 3 reference points corresponding to the 3 axles of the vehicle, during a first acceleration phase, Deducing from the tangential forces determined in step a) the corresponding normal forces during the first acceleration phase, d) Repeating steps a) and b) at least once during a second acceleration phase, wherein the acceleration of the vehicle is distinct from the first acceleration, and e) Deducing from the preceding steps the height of the gravity center G of the vehicle, by using one or more algorithms.

f) Optionally repeating steps a), b), d) and e) several times, and providing an average value of the height of COG.

For the specific case of a combination of a tractor and a semi-trailer, the method may be written as follows:

Determining the tangential forces at all the axles of the tractor and the semi-trailer, during a first acceleration phase, Deducing from the tangential forces determined in step a) the corresponding normal forces during the first acceleration phase, Determining the normal force at the fifth wheel of the tractor, during a first acceleration phase, using the values of the tangential and normal forces at the axles of the tractor only, determined during the steps a) and b), Repeating steps a), b), and c) at least once during a second acceleration phase, wherein the acceleration of the vehicle is distinct from the first acceleration, and Deducing from the preceding steps the height of the gravity center G of the semi-trailer, by computing the normal forces at the first axle of the tractor, a rear axle of the semi-trailer and at the fifth wheel, according to an algorithm.

The following optional step is still valid:

Repeating steps a) to e) several times and providing an average value of the height of COG.

The present invention also encompasses, according to an aspect thereof, a vehicle wherein the determination of the height of the gravity center is determined according to the method hereby described.

DETAILED DESCRIPTION

The method of the present invention, according to an aspect thereof, comprises a first step of determining the tangential forces TAn at the axles An of a vehicle v.

In general way, a tangential force is determined at a given axle An, during a braking period x, according to the formula (1):

$$TAnx = Q \cdot VAnx + FAnx \qquad (1)$$

Wherein $TAnx$ denotes the tangential force at an axle An during a braking period x, $Q$ denotes the brake factor, $VAnx$ denotes the braking pressure applied at an axle An during a braking period x, $FAnx$ denotes the driving force applied at an axle An during a braking period x.

In case an axle does not correspond to a driving axle, then the corresponding driving force FAn equals 0.

Figure 1:
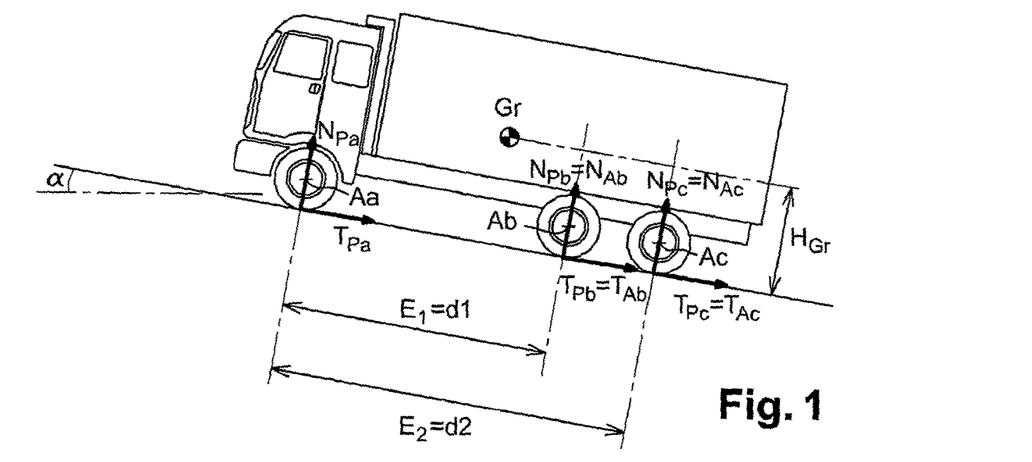
FIG. 1: Tangential and normal forces in a rigid vehicle having 3 axles, during an acceleration period.

For a rigid truck having 3 axles Aa, Ab and Ac, the tangential forces at each of these axles can be independently determined according to the following formulae (1a), (1b) and (1c):

$$TAax = Q \cdot VAax + FAax \qquad (1a)$$

$$TAbx = Q \cdot VAbx + FAbx \qquad (1b)$$

$$TAcx = Q \cdot VAcx + FAcx \qquad (1c)$$

Wherein

TAax, TAbx and TAcx denote the tangential force at each of the corresponding axle Aa, Ab and Ac, during a braking period x, Q denotes the brake factor, VAax, VAbx and VAcx denote the braking pressure applied at each of the corresponding axle Aa, Ab, and Ac, during a braking period x, FAax, FAbx, and FAcx denote the driving force applied at each of the corresponding axle Aa, Ab, and Ac, during a braking period x.

In general, for a rigid vehicle having n axles, wherein n=3, 4, 5 or more, formula of type (1) can be independently applied to each of the n axles.

Figure 2:
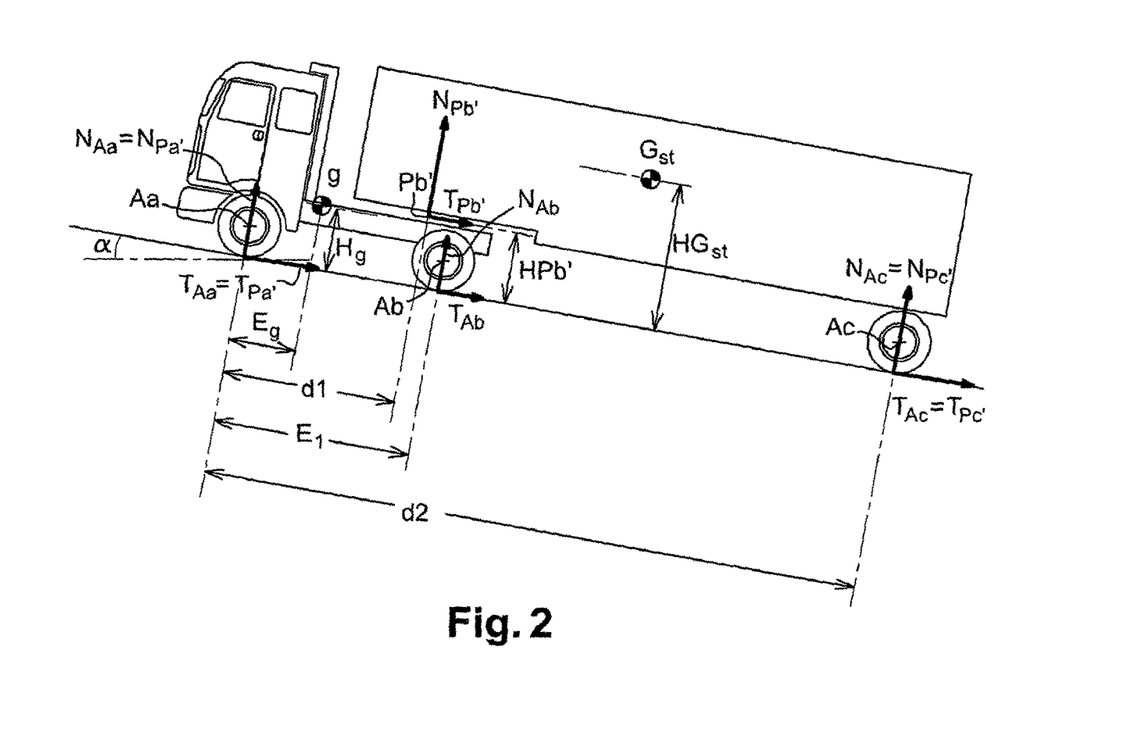
FIG. 2: Tangential and normal forces in a combination of a tractor having 2 axles and a semi-trailer, during an acceleration period.
Figure 3:
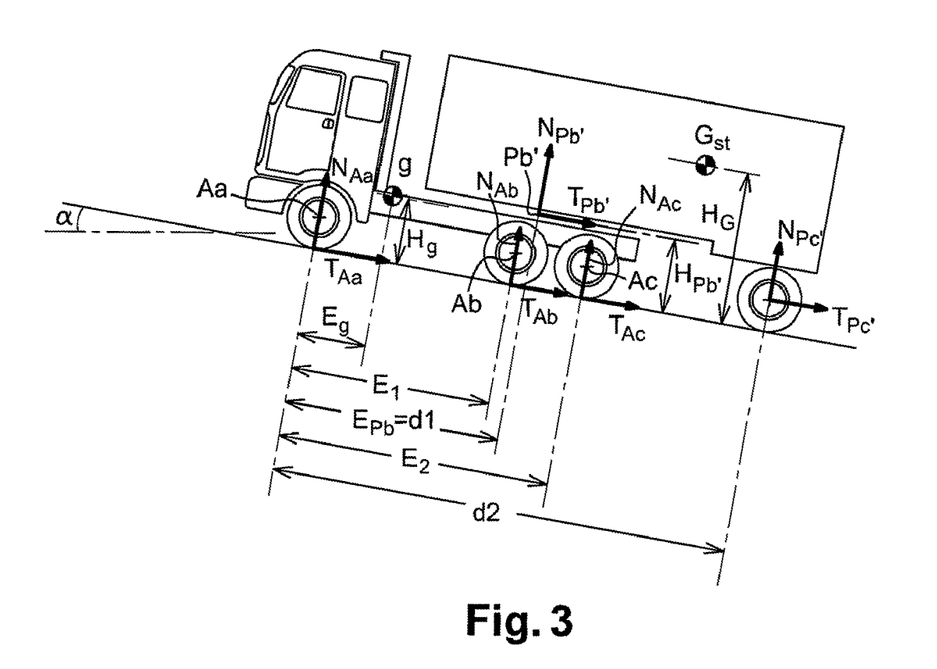
FIG. 3: Tangential and normal forces in a combination of a tractor having 3 axles and a semi-trailer, during an acceleration period.

For a combination of a tractor and a semi-trailer, the above formula (1) is applied to all the axles of the vehicle, including those of the semi-trailer.

The present method, according to an aspect thereof, further comprises a step of determining the normal forces NAn at each of the n axles of the vehicle. The normal forces NAn may be for example deduced from the corresponding tangential forces TAn determined above. To this extend, the slippage rate τw of the wheels w, may be used according to the formulae (4):

$$\tau w = \frac{Sv - Sw}{Sv} \quad (4)$$

Wherein

τw denotes the slippage rate of a wheel w,

Sv denotes the absolute speed of a vehicle v,

Sw denotes the speed of the wheel w on the ground.

On a given axle An, the slippage rate τw may be different from one wheel to another. The present method can consider either of the following alternatives:

The slippage rate τAn of an axle An corresponds to the average of the slippage rate τw of all its wheels.

The slippage rate τAn of an axle An corresponds to the lowest slippage rate τw of all its wheels.

The slippage rate τAn of an axle An corresponds to the highest slippage rate τw of all its wheels.

A normal force NAn at a given axle An may be determined, during a braking period x, according to the general formula (5):

$$N_{Anx} = \frac{T_{Anx}}{\eta_{An} \cdot a_{An} \cdot \tau_{An}} \quad (5)$$

Wherein

NAnx denotes the normal forces at an axle An during a braking period x,

TAnx denotes the tangential forces at an axle An during a braking period x,

ηAn denotes the number of wheels at the axle An, aAn denotes a coefficient comprised between 0 and 1, τAn denotes the slippage rate of the wheels of an axle An.

τAn preferably denotes the average slippage rate of the wheels of a given axel An and TAn preferably corresponds to the cumulative tangential forces at said axle An. However, the calculus may be applied to each wheel individually.

The coefficient a represents the adherence of a given wheel on the ground. A coefficient equal to 0 means no adherence at all, whereas a coefficient equal to 1 means a perfect adherence. In practice the coefficient a may be comprised between 0.2 and 0.8. For the purpose of the determination of the height of the gravity center according to the present method, according to an aspect thereof, it is considered that all the wheels of the vehicles have the same coefficient a.

For a rigid vehicle having 3 axles Aa, Ab, and Ac, the normal forces at each of these axles may thus be independently determined according to the formulae (5a), (5b) and (5c):

$$N_{Aax} = \frac{T_{Aax}}{\eta_{Aa} \cdot a \cdot \tau_{Aa}} \quad (5a)$$

$$N_{Abx} = \frac{T_{Abx}}{\eta_{Ab} \cdot a \cdot \tau_{Ab}} \quad (5b)$$

$$N_{Acx} = \frac{T_{Acx}}{\eta_{Ac} \cdot a \cdot \tau_{Ac}} \quad (5c)$$

Wherein

NAax, NAbx and NAcx denote respectively the normal force at the Axles Aa, Ab and Ac, during a braking period x, TAax, TAbx and TAcx denote respectively the tangential forces at each of the axles Aa, Ab, and Ac during a braking period x, η denotes the number of wheels at an axle An, a denotes the coefficient of adherence above discussed.

τAa, τAb, τAc denote respectively the average slippage rate of the wheels of the corresponding axles Aa, Ab, and Ac.

In case the rigid truck has 4 or more reference points, corresponding to its 4 or more axles, formula of type (5) can independently be applied to each of the axles.

For a combination of a tractor and a semi-trailer, the normal force at one of the reference point may not be directly determined as above-discussed. For example in case one of the reference point Pb' is the fifth wheel, then the corresponding normal force NPb' can be computed based on the tangential and normal forces previously determined at the axles An of the tractor. Where the tractor has 2 axles, the normal forces NPb' at the reference points Pb' may be determined according to the formula (8a) below:

$$N_{Pb'} = \frac{N_g \text{Cos}(\alpha)[(E1 - E_g)Y_a - E_g Y_b] + (Y_a + Y_b)}{[(E_g - E1) \cdot Y_a + E_g \cdot Y_b] + (E_{Pb'} - E_g)[Y_b + Y_a]} \quad (8a)$$

$$[H_g(T_{Aa} + T_{Ab} + F_{Ab} + F_{Aa}) + (H_{Pb'} - H_g)T_{Pb'}]$$

Wherein

Ya denotes $T_{Ab}\tau_{Aa}$

Yb denotes $T_{Aa}2\tau_{Ab}$

Ng denotes the normal force at the center of gravity g of the tractor

NPb' denotes the normal force at the point of reference Pb'

E1 denotes the distance between the first axle Aa and the second axle Ab of the tractor TAa denotes the tangential force at the first axle Aa TAb denotes the tangential force at the second axle Ab TPb' denotes the tangential force at the reference point Pb'

τAa denotes the average slippage rate of the wheels of the first axle Aa,

τAb denotes the average slippage rate of the wheels of the second axle Ab,

Eg denotes the distance between the gravity center g of the tractor and its first axle Aa Hg denotes the height of the gravity center g of the tractor EPb' denotes the distance between the reference point Pb' and the first axle Aa of the tractor HPb' denotes the height of the reference point Pb'

α denotes the inclination angle of the slope

It has to be noted that the normal force NPb' determined at the fifth wheel of the tractor corresponds to the normal force of the semi-trailer onto the tractor.

Similarly, the term TPb' corresponds to the tangential force at the fifth wheel, and results from the action of the semi-trailer.

In a general way, the tangential force TPb' can be determined according to the following formula (9)

$$T_{Pb'} = F_{An} + T_{An} - P_{TR} \cdot \text{Sin}(\alpha) + m \cdot \gamma \quad (9)$$

Wherein

FAn denotes the driving forces at all the An axles,

TAn denotes the tangential forces at all the An axles,

PTR denotes the weight of the tractor m denotes the mass of the vehicle

γ denotes the acceleration

α denotes the slope of the ground

Where the tractor has 2 axles, TPb' can be determined according to the following formula (9a)

$$T_{Pb'} = F_{Aa} F_{Ab} + F_{Aa} + T_{Aa} + T_{Ab} - P_{TR} \cdot \text{Sin}(\alpha) + m \cdot \gamma \quad (9a)$$

Wherein

TPb' denotes the tangential force at the reference point Pb', corresponding to the fifth wheel FAa denotes the driving force at the front axle Aa, FAb denotes the driving force at the second axle of the tractor Ab, TAa denotes the tangential force at the front axle Aa, TAb denotes the tangential force at the second axle of the tractor Ab, m denotes the mass of the vehicle, γ denotes the acceleration, α denotes the slope of the ground, and PTr denotes the weight of the tractor The normal forces NPa' at the reference point Pa', and NPc' at the reference point Pc', are still determined according to the formula (5) above.

In case the tractor has 3 axles, the following formula (8b) can be used:

$$N_{Pb'} = \frac{N_g \text{Cos}(\alpha) Z_1 - H_g (T_{Aa} + T_{Ab} + T_{Ac} - T_{Pb'}) Z_2}{Z_3 + (E_g - E_{Pb'}) Z_2} \quad (8b)$$

Wherein $Z1 = \{E_g T_{Aa} X_{Ac} X_{Ab} - 2\tau_{Aa}(E1 - E_g) T_{Ab} X_{Ac} - (E_g - E_{Pb'}) 2\tau_{Aa} T_{Ab} X_{Ab}\}$ $Z2 = \{2\tau_{Aa} T_{Ab} X_{Ac} + X_{Ab} T_{Aa} X_{Ac} + 2\tau_{Aa} T_{Ac} X_{Ab}\}$ $Z3 = \{2\tau_{Aa}(E1 - E_g) T_{Ab} X_{Ac} + (E_g - E_{Pb'}) 2\tau_{Aa} T_{Ac} X_{Ab} - E_g T_{Aa} X_{Ac} X_{Ab}\}$ Where:

NPb' denotes the normal force at the point of reference Pb'

Ng denotes the normal force at the center of gravity g of the tractor

E1 denotes the distance between the first axle Aa and the second axle Ab

Eg denotes the distance between the gravity center g of the tractor and its first axle Aa Hg denotes the height of the gravity center g of the tractor TAa denotes the tangential force at the first axle Aa of the tractor, TAb denotes the tangential force at the second axle Ab of the tractor TAc denotes the tangential force at the third axle Ac of the tractor TPb' denotes the tangential force at the reference point Pb'

τAa denotes the average slippage rate of the wheels of the first axle Aa of the tractor τAb denotes the average slippage rate of the wheels of the second axle Ab of the tractor τAc denotes the average slippage rate of the wheels of the third axle Ac of the tractor EPb' denotes the distance between the reference point Pb' and the first axle Aa of the tractor XAb denotes ηAbτAb, wherein ηAb is the number of wheels at the axle Ab XAc corresponds to the terms ηAcτAc wherein ηAc is the number of wheels of the axle Ac In this specific case, the term TPb' can be determined according to the formula (9b):

$$R_T = F_{Aa} + F_{Ab} + F_{Ac} + T_{Aa} + T_{Ab} + T_{Ac} + m \cdot \gamma - P_{TR} \cdot \text{Sin}(\alpha) \quad (9b)$$

Wherein

FAc denotes the driving force at the third axle Ac,

TAc denotes the tangential force at the third axle Ac,

And wherein the other numerical references have the same meaning as above.

Formulae (8a) and (8b) are specific examples on how the normal forces NPb' can be determined at the reference point Pb'. However, any other method allowing to determine the normal force at the reference point Pb', during braking phases, can be used as alternative.

The values of normal forces, obtained for each of the 3 reference points, are determined according to the steps above-discussed during at least 2 distinct acceleration phases, wherein the acceleration of the vehicle is preferably not the same. Thus, at least 2 sets of values are obtained corresponding to a first acceleration phase and a second acceleration phase.

It is preferable that the steps are repeated while the slope remains unchanged.

The 2 sets of values are computed according to the following formula (10) to determine the height of COG:

$$HG = \frac{d_1(N_{Pb2} - N_{Pb1}) + d_2(N_{Pc2} - N_{Pc1}) + \theta}{m(\gamma_2 - \gamma_1)} \quad (10)$$

Wherein

HG denotes the height of the gravity center G of the vehicle if it is a rigid vehicle, or the height of the gravity center of the semi-trailer in case of a combination of a tractor and a semi-trailer.

d1 denotes the distance between the first reference point Pa and the second reference point Pb, d2 denotes the distance between the first reference point Pa and the third reference point Pc, NPb2 denotes the normal force at the second reference point Pb during the second braking phase, NPb1 denotes the normal force at the second reference point Pb during the first braking phase, NPc2 denotes the normal force at the reference point Pc during the second braking phase, NPc1 denotes the normal force at reference point Pc during the first braking phase, m denotes the mass of the vehicle,
γ2 denotes the acceleration during the second braking phase,
γ1 denotes the acceleration during the first braking phase,
θ denotes a corrective value.

The corrective value θ may be equal to 0 for a rigid vehicle. Thus, in the particular case of a rigid vehicle having 3 axles, corresponding to the 3 reference points Pa, Pb and Pc, the height of the gravity center HGr is determined according to the formula (10a):

$$HG_r = \frac{d_1(N_{Pb2} - N_{Pb1}) + d_2(N_{Pc2} - N_{Pc1})}{m(\gamma_2 - \gamma_1)} \quad (10a)$$

Wherein
HGr denotes the height of the gravity center Gr of the rigid vehicle,
d1 denotes the distance between the first reference point Pa, corresponding to the first axle Aa, and the second reference point Pb, corresponding to the second axle Ab,
d2 denotes the distance between the first reference point Pa, corresponding to the first axle Aa, and the third reference point Pc, corresponding to the third axle Ac,
NPb2 denotes the normal force at the second reference point Pb during the second braking phase,
NPb1 denotes the normal force at the second reference point Pb during the first braking phase,
NPc2 denotes the normal force at the reference point Pc during the second braking phase,
NPc1 denotes the normal force at reference point Pc during the first braking phase,
m denotes the mass of the vehicle,
γ2 denotes the acceleration during the second braking phase,
γ1 denotes the acceleration during the first braking phase, The corrective value θ may be equal to the terms HPb' (TPb'2−TPb'1) for a combination of a tractor and a semi-trailer. Thus, in this particular case, the height of the gravity center HGst of the semi-trailer will be determined by the formula (10b):

$$HG_{st} = \frac{d'_1(N_{Pb'2} - N_{Pb'1}) + d'_2(N_{Pc'2} - N_{Pc'1}) + H_{Pb'}(T_{Pb'2} - T_{Pb'1})}{m(\gamma_2 - \gamma_1)} \quad (10b)$$

Wherein
d'1 denotes the distance between the first axle of the tractor Aa and the reference point Pb', corresponding to the fifth wheel of the tractor,
d'2 denotes the distance between the first axle of the tractor Aa and the reference point Pc', corresponding to a rear axle of the semi-trailer,
NPb'2 denotes the normal force at the reference point Pb' during the second braking period,
NPb'1 denotes the normal force at the reference point Pb' during the first braking period,
NPc'2 denotes the normal force at the reference point Pc' during the second braking period,
NPc'1 denotes the normal force at the reference point Pc' during the first braking period,
HPb' denotes the height of the reference point Pb',
TPb'2 denotes the tangential force at the reference point Pb' during a second braking phase,
TPb'1 denotes the tangential force at the reference point Pb' during a first braking phase,
m denotes the mass of the vehicle,
γ2 denotes the acceleration during the second braking phase,
γ1 denotes the acceleration during the first braking phase,

The invention claimed is:

1. Method of determination of the height of the gravity center HG (HGr, Hg, HGst) of a vehicle, or an element of the vehicle, wherein 3 reference points Pa, Pb and Pc are predetermined, the method comprising the steps of:
   a) determining the tangential forces TAn (TAax, TAbx, TAcx) at all the axles An (Aa, Ab, Ac) of the vehicle, during a first acceleration phase,
   b) deducing from the tangential forces TAn (TAax, TAbx, TAcx) determined in step a) the corresponding normal forces NAn (NAax, NAbx, NAcx) during the first acceleration phase,
   c) determining the normal force NPb at one of the predetermined reference points Pb, during a first acceleration phase, using the values determined in steps a) and b),
   d) repeating steps a), b), and c) at least once during a second acceleration phase, distinct from the first acceleration phase, and
   deducing from the preceding steps a), b), c) and d) the height of the gravity center HG (HGr, Hg, HGst) of the vehicle, or an element of the vehicle, by computing the normal forces NPa, NPb and NPc at the 3 predetermined reference points Pa, Pb and Pc, using an algorithm wherein in step a) the tangential forces TAn are determined according to the formula (1):
   TAnx=Q·VAnx+FAnx (1) wherein:
   TAnx denotes the tangential force at an axle An during a braking period x,
   Q denotes the brake factor,
   VAnx denotes the braking pressure applied at an axle An during a braking period x, and
   FAnx denotes the driving force applied at an axle An during a braking period x.

2. Method according to claim 1, wherein the normal forces are deduced from the tangential forces in step b) according to the general formula (5):

$$N_{Anx} = \frac{T_{Anx}}{\eta_{An} \cdot a_{An} \cdot \tau_{An}} \quad (5)$$

wherein:
   NAnx denotes the normal force at an axle An during a braking period x,
   TAnx denotes the tangential forces at an axle An during a braking period x,
   ηAn denotes the number of wheels at the axle An,
   aAn denotes a coefficient comprised between 0 and 1, and
   τAn denotes the slippage rate of the wheels of an axle An.

3. Method according to claim 1, wherein the vehicle is a rigid vehicle having 3 axles Aa, Ab and Ac, and wherein the 3 reference points Pa, Pb and Pc correspond to the 3 axles (Aa, Ab, Ac).

4. Method according to claim 1, wherein the vehicle is an assembly of a tractor and a semi-trailer, wherein one of the reference points Pa corresponds to an axle Aa of the tractor, a second reference point Pc corresponds to an axle Ac of the semi-trailer, and wherein the third reference point Pb corresponds to the fifth wheel of the tractor.

5. Method according to claim 1, wherein the vehicle is an assembly of a tractor having two axles and a semi-trailer, wherein one of the reference point Pb corresponds to the fifth wheel of the tractor, and wherein the normal force at reference point Pb is determined in step c) according to formula (8a):

$$N_{Pb'} = \frac{N_g \cos(\alpha)[(E1 - E_g)Y_a - E_g Y_b] + (Y_a + Y_b)}{[H_g(T_{Aa} + T_{Ab} + F_{Ab} + F_{Aa}) + (H_{Pb'} - H_g)T_{Pb'}]} \quad (8a)$$
$$\phantom{N_{Pb'} = } \frac{}{[(E_g - E1) \cdot Y_a + E_g \cdot Y_b] + (E_{Pb'} - E_g)[Y_b + Y_a]}$$

wherein:
Ya denotes $T_{Ab}T_{Aa}$,
Yb denotes $T_{Aa}2\tau_{Ab}$,
Ng denotes the normal force at the center of gravity g of the tractor,
NPb' denotes the normal force at the point of reference Pb',
E1 denotes the distance between the first axle Aa and the second axle Ab of the tractor,
TAa denotes the tangential force at the first axle Aa,
TAb denotes the tangential force at the second axle Ab,
TPb' denotes the tangential force at the reference point Pb',
τAa denotes the slippage rate at the first axle Aa,
τAb denotes the slippage rate at the second axle Ab,
Eg denotes the distance between the gravity center g of the tractor and its first axle Aa,
Hg denotes the height of the gravity center g of the tractor,
EPb' denotes the distance between the reference point Pb' and the first axle Aa of the tractor,
HPb' denotes the height of the reference point Pb', and
α denotes the inclination angle of the slope.

6. Method according to claim 1, wherein the vehicle is an assembly of a tractor having three axles and a semi-trailer, wherein one of the reference point Pb' corresponds to the fifth wheel of the tractor, and wherein the normal force at the fifth wheel is determined in step c) according to formula (8b):

$$N_{Pb'} = \frac{N_g \cos(\alpha)Z_1 - H_g(T_{Aa} + T_{Ab} + T_{Ac} - T_{Pb'})Z_2}{Z_3 + (E_g - E_{Pb'})Z_2} \quad (8b)$$

wherein:

$Z_1 = \{E_g T_{Aa} X_{Ac} X_{Ab} - 2\tau_{Aa}(E1 - E_g)T_{Ab}X_{Ac}(E_g - E_{Pb'})$
$\phantom{Z_1 = \{}2\tau_{Aa}T_{Ab}X_{Ab}\}$ $Z_2 = \{2\tau_{Aa}T_{Ab}X_{Ac} + X_{Ab}T_{Aa}X_{Ac} + 2\tau_{Aa}T_{Ac}X_{Ab}\}$ $Z_3 = \{2\tau_{Aa}(E1-E_g)T_{Ab}X_{Ac} + (E_g - E_{Pb'})2\tau_{Aa}T_{Ac}X_{Ab} - E_g T_{Ac}X_{Ac}X_{Ab}\}$ where:
NPb' denotes the normal force at the point of reference Pb',
Ng denotes the normal force at the center of gravity g of the tractor,
E1 denotes the distance between the first axle Aa and the second axle Ab,
Eg denotes the distance between the gravity center g of the tractor and its first axle Aa,
Hg denotes the height of the gravity center g of the tractor,
TAa denotes the tangential force at the first axle Aa of the tractor,
TAb denotes the tangential force at the second axle Ab of the tractor,
TAc denotes the tangential force at the third axle Ac of the tractor,
TPb' denotes the tangential force at the reference point Pb',
τAa denotes the slippage rate at the first axle Aa of the tractor,
τAb denotes the slippage rate at the second axle Ab of the tractor,
τAc denotes the slippage rate at the third axle Ac of the tractor,
EPb' denotes the distance between the reference point Pb' and the first axle Aa of the tractor,
XAb denotes $\eta_{Ab}\tau_{Ab}$, wherein $\eta_{Ab}$ is the number of wheels at the axle Ab, and
XAc corresponds to the terms $\eta_{Ac}\tau_{Ab}$ wherein $\eta_{Ac}$ is the number of wheels of the axle Ac.

7. Method according to claim 1, wherein the algorithm used in the determination of the height of the gravity center HG in step e) comprises the following formula $$HG = \frac{d_1(N_{Pb2} - N_{Pb1}) + d_2(N_{Pc2} - N_{Pc1}) + \theta}{m(\gamma_2 - \gamma_1)} \quad (10)$$

wherein:
HG denotes the height of the gravity center,
d1 denotes the distance between the reference point Pa and the reference point Pb,
d2 denotes the distance between the reference point Pa and the reference point Pc,
NPb2 denotes the normal force at the reference point Pb during the second braking phase,
NPb1 denotes the normal force at the reference point Pb during the first braking phase,
NPc2 denotes the normal force at the reference point Pc during the second braking phase,
NPc1 denotes the normal force at reference point PC during the first braking phase, m denotes the mass of the vehicle,
γ2 denotes the acceleration during the second braking phase,
γ1 denotes the acceleration during the first braking phase, and
θ denotes a corrective value.

8. Method according to claim 7, wherein θ is selected from 0 for a rigid truck and the term HPb' (TPb'2-TPb'1), for a vehicle comprising a tractor and a semi-trailer, wherein:
HPb' denotes the height of the reference point Pb', when Pb' corresponds to the fifth wheel,
TPb'2 denotes the tangential force at the reference point Pb' during the second braking phase, and
TPb'1 denotes the tangential force at the reference point Pb' during the first braking force.

9. A-Method of determination of the height of the gravity center HG (HGr, Hg, HGst) of a vehicle, the vehicle comprising a tractor having at least three axles (Aa, Ab, Ac) and a semi-trailer, wherein 3 reference points Pa, Pb and Pc are predetermined, the method comprising the steps of:
a) determining the tangential forces TAn (TAax, TAbx, TAcx) at all the axles An (Aa, Ab, Ac) of the vehicle, during a first acceleration phase,
b) deducing from the tangential forces TAn (TAax, TAbx, TAcx) determined in step a) the corresponding normal forces NAn (NAax, NAbx, NAcx) during the first acceleration phase, c) determining the normal force NPb at one of the predetermined reference points Pb, during a first acceleration phase, using the values determined in steps a) and b), d) repeating steps a), b), and c) at least once during a second acceleration phase, distinct from the first acceleration phase, and deducing from the preceding steps a), b), c) and d) the height of the gravity center HG (HGr, Hg, HGst) of the vehicle, or an element of the vehicle, by computing the normal forces NPa, NPb and NPc at the 3 predetermined reference points Pa, Pb and Pc, using an algorithm wherein in step a) the tangential forces TAn are determined according to the formula (1): TAnx=QVAnx+FAnx (1) wherein:

TAnx denotes the tangential force at an axle An during a braking period x,

Q denotes the brake factor,

VAnx denotes the braking pressure applied at an axle An during a braking period x, and FAnx denotes the driving force applied at an axle An during a braking period x.

10. Method of determination of the height of the gravity center HG (HGr, Hg, HGst) of a vehicle, or an element of the vehicle, wherein 3 reference points Pa, Pb and Pc are predetermined, the method comprising the steps of:

a) determining the tangential forces TAn (TAax, TAbx, TAcx) at all the axles An (Aa, Ab, Ac) of the vehicle, during a first acceleration phase, b) deducing from the tangential forces TAn (TAax, TAbx, TAcx) determined in step a) the corresponding normal forces NAn (NAax, NAbx, NAcx) during the first acceleration phase, c) repeating steps a) and b) at least once during a second acceleration phase, distinct from the first acceleration phase, and deducing from the preceding steps a), b), and c) the height of the gravity center HG (HGr, Hg, HGst) of the vehicle, or an element of the vehicle, by computing the normal forces NPa, NPb and NPc at the 3 predetermined reference points Pa, Pb and Pc, using an algorithm wherein in step a) the tangential forces TAn are determined according to the formula (1): (1) TAnx=QVAnx+FAnx wherein:

TAnx denotes the tangential force at an axle An during a braking period x,

Q denotes the brake factor,

VAnx denotes the braking pressure applied at an axle An during a braking period x, and FAnx denotes the driving force applied at an axle An during a braking period x.

* * * * *